United States Patent [19]

Pirovano

[11] 3,834,591

[45] Sept. 10, 1974

[54] BATCH FEEDER WITH FLEXIBLE AND ADJUSTABLE CONTAINER WALLS

[76] Inventor: Camillo Pirovano, Via Spluga, Cernusco, Lombardone, Italy

[22] Filed: June 16, 1972

[21] Appl. No.: 263,690

[30] Foreign Application Priority Data
June 25, 1971   Italy.................................. 26320/71

[52] U.S. Cl...................... 222/185, 150/1, 222/558
[51] Int. Cl.............................................. B67d 3/00
[58] Field of Search ........ 150/1; 222/206, 212, 438, 222/102, 105, 558, 130, 185

[56] References Cited
UNITED STATES PATENTS
| | | | |
|---|---|---|---|
| 2,663,466 | 12/1953 | Heltzel............................ | 222/558 X |
| 3,112,845 | 12/1963 | Bryant......................... | 222/386.5 X |
| 3,203,247 | 8/1965 | Bicek............................. | 222/212 X |
| 3,235,138 | 2/1966 | Bull.............................. | 222/386.5 X |
| 3,632,039 | 1/1972 | Gayle................................. | 150/1 X |

*Primary Examiner*—Robert B. Reeves
*Assistant Examiner*—David A. Scherbel
*Attorney, Agent, or Firm*—Stevens, Davis, Miller & Mosher

[57] ABSTRACT

Batch feeder, particularly for distributing fodder in animal breeding places, comprising a container with a tubular wall, which is deformable axially and resiliently, a discharge mouth for the product to be delivered, a discharge valve mounted in said mouth and means controlling the axial deformation of said tubular wall, whereby the capacity of the batch feeder can be adjusted and any seepage through the discharge valve is avoided.

5 Claims, 10 Drawing Figures

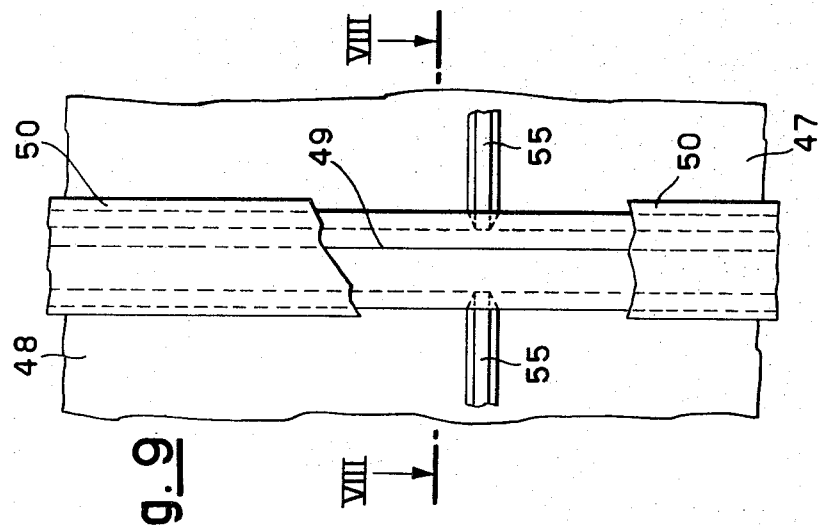
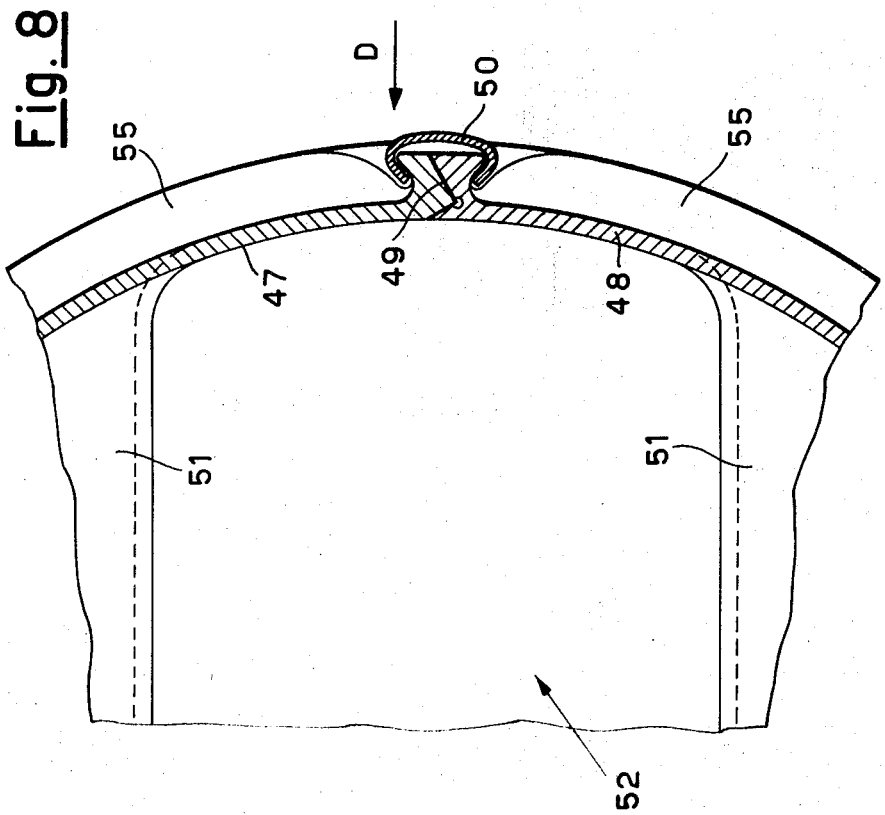

3,834,591

BATCH FEEDER WITH FLEXIBLE AND ADJUSTABLE CONTAINER WALLS

The present invention relates to a batch feeder particularly suitable for distributing fodder in animal breeding places.

In batch feeders of known type for distributing fodder in animal breeding grounds, the capacity of the batch feeder and hence the quantity of fodder delivered by it is regulated by means of a discharge gate valve constituting the bottom of the batch feeder, and movable axially from the bottom upwards and vice versa with respect to the batch feeder body.

Batch feeders of this type are of relatively complex and costly construction, and moreover as the closure of said gate valve is made between a ledge on the batch feeder body and an edge portion of the valve, it has been found that some granules of fodder can become imprisoned between said ledge and said edge portion, so preventing tight closures of the valve and giving rise to a consequent seepage of fodder, especially of that having a particle size less than the particle size of the granules imprisoned between the valve and ledge.

A first object of the invention is to provide a batch feeder, particularly for distributing fodder in animal breeding places, of more simple and economical construction than that of batch feeders of known type.

A further object of the invention is to provide a batch feeder in which the possibility of seepage of fodder when the discharge valve is closed is practically eliminated.

These objects according to the invention are attained by a batch feeder comprising a container with a tubular wall deformable axially and resiliently, means for controlling said axial deformation and a mouth provided with a discharge valve for delivery of the product.

In one embodiment of the invention the axially and resiliently deformable tubular wall constitutes the container of the batch feeder.

In another embodiment of the invention said tubular wall is surrounded by another rigid coaxial tubular wall which forms an interspace with it so as to form a container of annular cross-section.

Said axially and resiliently deformable tubular wall preferably comprises a helical spring lined with a flexible material attached to the coils of the spring. These and other characteristics, objects and advantages of the invention will be more evident from an examination of the following description given by way of example with reference to the accompanying drawings in which:

FIG. 8 is a sectional view of a detail taken on the line VIII—VIII of FIGS. 5 and 9;

FIG. 9 is a detail in the direction of the arrow D of FIG. 8; and

Figure 1:
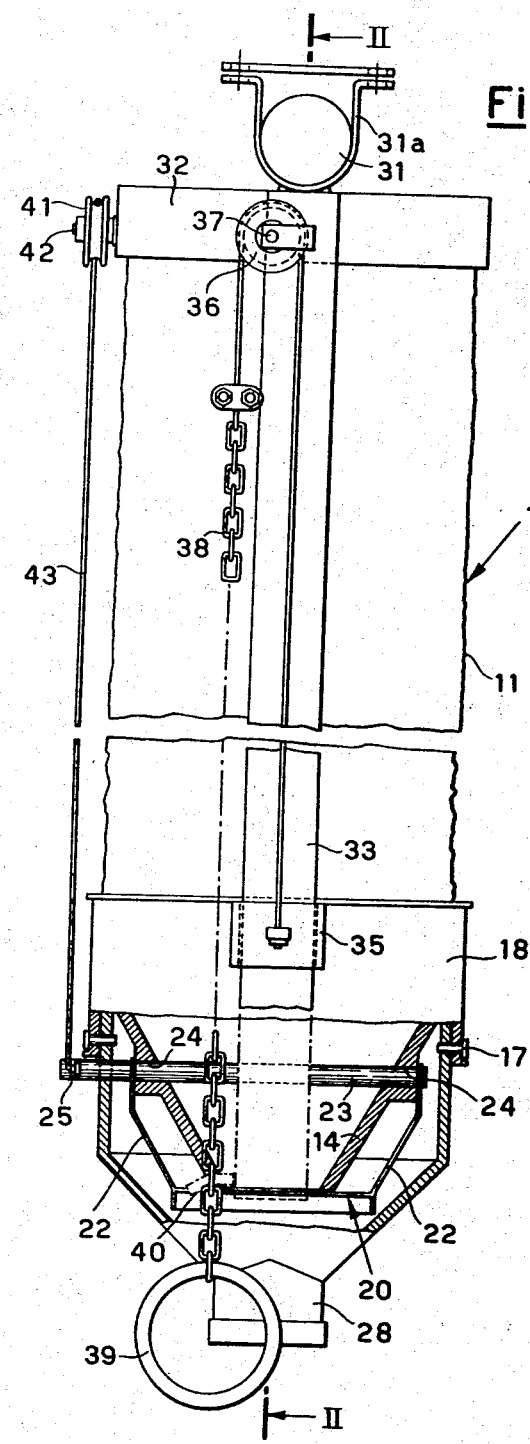
FIG. 1 is a partially sectional elevational view illustrating a first embodiment of a batch feeder according to the invention.
Figure 2:
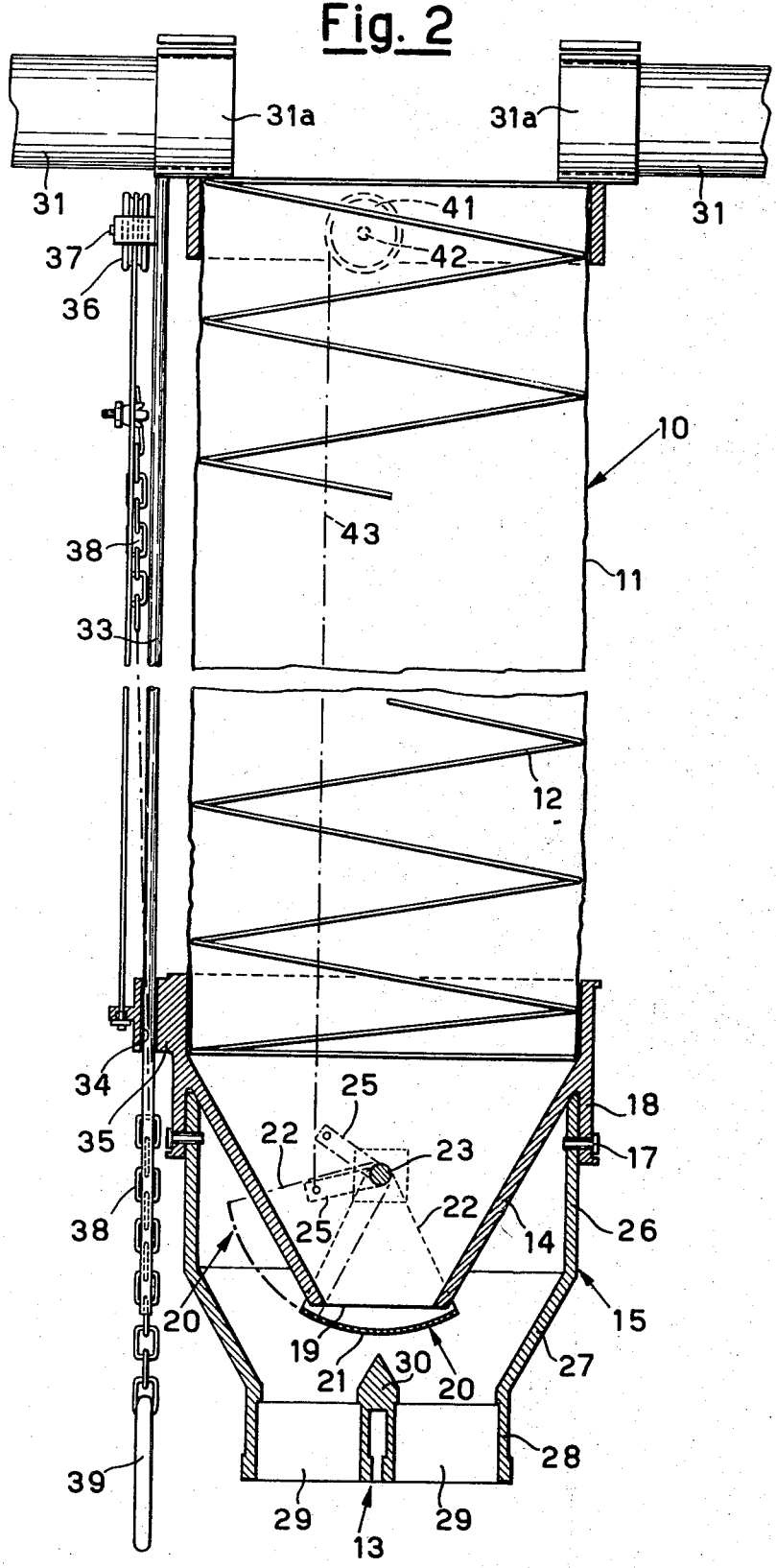
FIG. 2 is a section on the line II—II of FIG. 1, illustrating the batch feeder in the position of maximum capacity.
Figure 3:
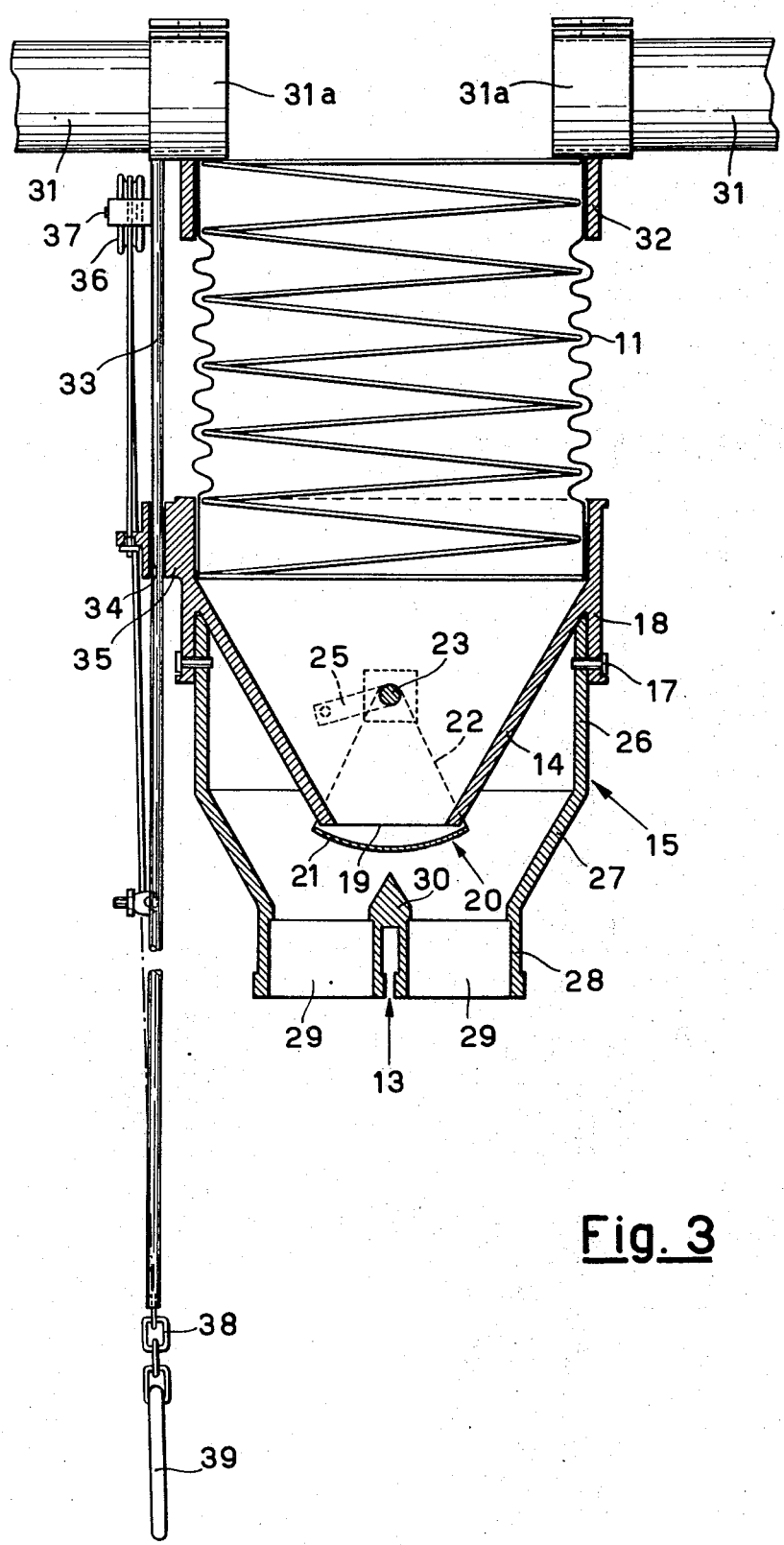
FIG. 3 is a view similar to that of FIG. 2, but illustrating the batch feeder in a position of intermediate capacity.

FIGS. 1, 2 and 3 of the drawings show a first embodiment of a batch feeder according to the invention indicated overall by the reference numeral 10. Said batch feeder structurally comprises a tubular body or container 11, of flexible material, within which is housed a helical spring 12, with each coil attached to the body 11.

The body 11 so constituted is provided at its lower extremity with a discharge mouth for the material, indicated overall by the reference numeral 13. Said discharge mouth 13 comprises a first truncated conical hopper 14 attached to the body 11 and a second hopper 15 fixed by bolts 17 to an annular rim 18 of the first hopper and coaxial to it.

The first hopper 14 has a discharge aperture 19 controlled by a valve element 20. The valve element 20 consists of a curved bottom wall 21 designed to close and/or open the aperture 19 from which extend vertically two opposing walls 22 rigidly fixed to a shaft 23 rotably pivoted in holes 24 in the hopper 14. A radial arm 25 whose purpose will be explained in detail hereinafter extends from said shaft 23 and is rigid with it.

The second hopper 15 comprises a terminal cylindrical portion 26 fixed to said rim 18, an intermediate tapering portion 27 and a further terminal portion 28 lying below the discharge aperture 19 of the hopper 14. The portion 28 consists of two adjacent cylindrical discharge mouths 29 connected together at 30.

The batch feeder constituted in this manner is suspended from a support structure diagrammatically indicated by the reference numeral 31, for example by means of connectors 31a fixed to a ring 32 attached to that extremity of the body 11 opposite the discharge mouth. The batch feeder is supported by said structure 31 in such a manner that it may slide from the bottom upwards or vice versa on a guide rod 33 extending towards the bottom of the structure 31 and passing through a bore 34 in a projection 35 of the hopper 14.

The sliding of the batch feeder is controlled by a chain pulley system whose pulley 36 is idly pivoted at 37 on the rod 33 and whose chain 38 has one end fixed to said projection 35 of the hopper 14, and is provided at its other end with a grip 39. The links of the chain 38 are designed for insertion in a retention tooth 40 (FIG. 1) projecting radially from the rod 33 adjacent to its lower end.

Likewise, the valve element 20 (FIG. 1) is controlled by a pulley system whose pulley 41 is pivoted idly at 42 on the ring 32 and whose cable 43 has one end fixed to the arm 25 of the shaft 23 and is provided at its other end with a grip (not shown) similar to the grip 39.

The operation of the batch feeder heretofore described is as follows.

When the batch feeder is in the position shown in FIG. 2, its capacity is a maximum and delivery of the fodder takes place by opening the discharge aperture 19 of the hopper 14 by simply moving the valve element 20 into the position shown in FIG. 2 by dashed lines by means of its pulley system as heretofore described. When it is required to reduce the capacity of the batch feeder it is sufficient to change the body 11 from the state shown in FIG. 2 to the state shown in FIG. 3 by acting on the aforementioned pulley system relative to it, so compressing the helical spring 12. The batch feeder is locked in this and other positions in which the spring 12 is compressed by inserting a link of the chain 38 into the retention tooth 40 of the rod 33.

With reference to FIGS. 4 – 10 of the drawings, another embodiment of a batch feeder according to the invention is indicated overall by the reference numeral 44.

Said batch feeder 44 consists structurally of a first rigid external tubular wall 45 and a second tubular wall 46 mounted within the first wall and coaxial to it.

Figure 6:
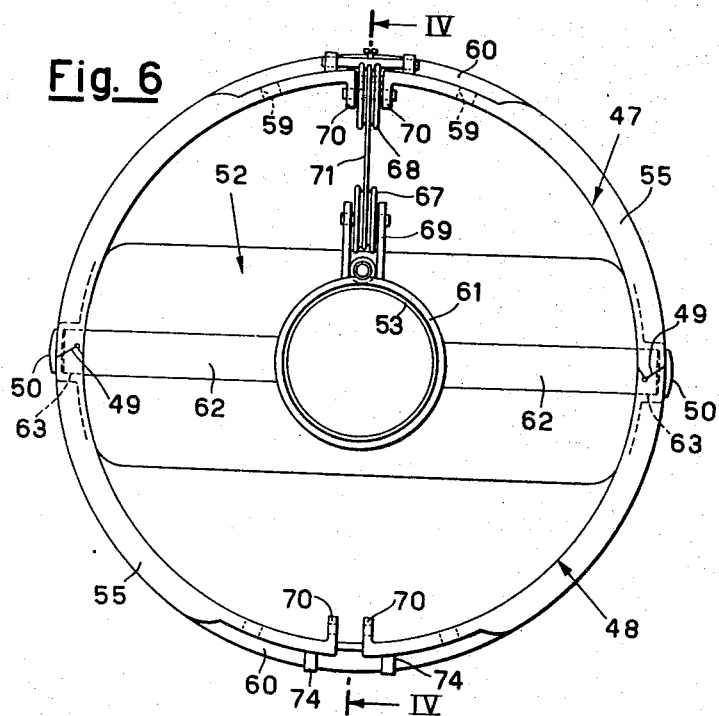
FIG. 6 is a plan view in the direction of the arrow B of FIG. 4.
Figure 7:
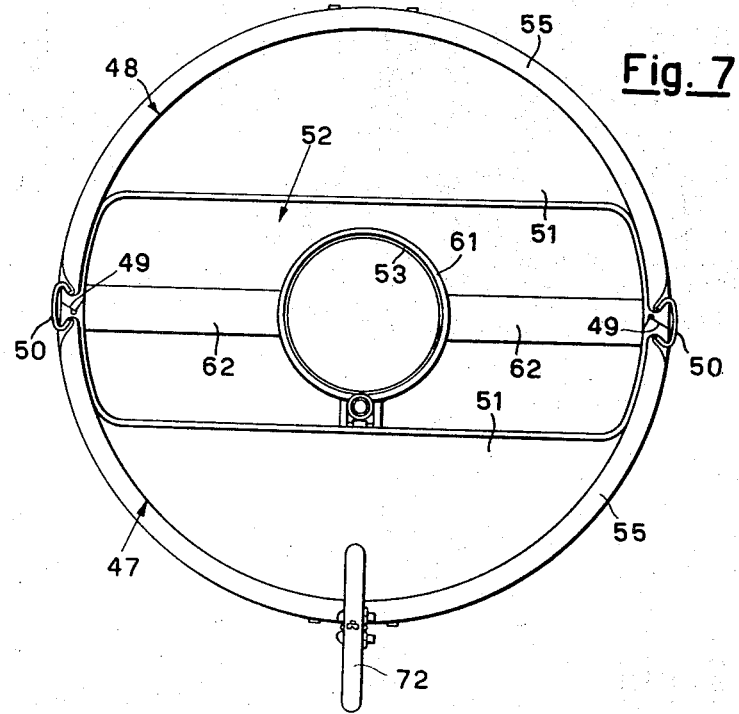
FIG. 7 is a plan view in the direction of the arrow B of FIG. 4.

The wall 45 (FIGS. 6, 7, 8 and 9) consists preferably, but not necessarily, of two equal semicylindrical halves 47, 48, each formed from a single piece of plastics material (FIGS. 6 and 7).

Figure 4:
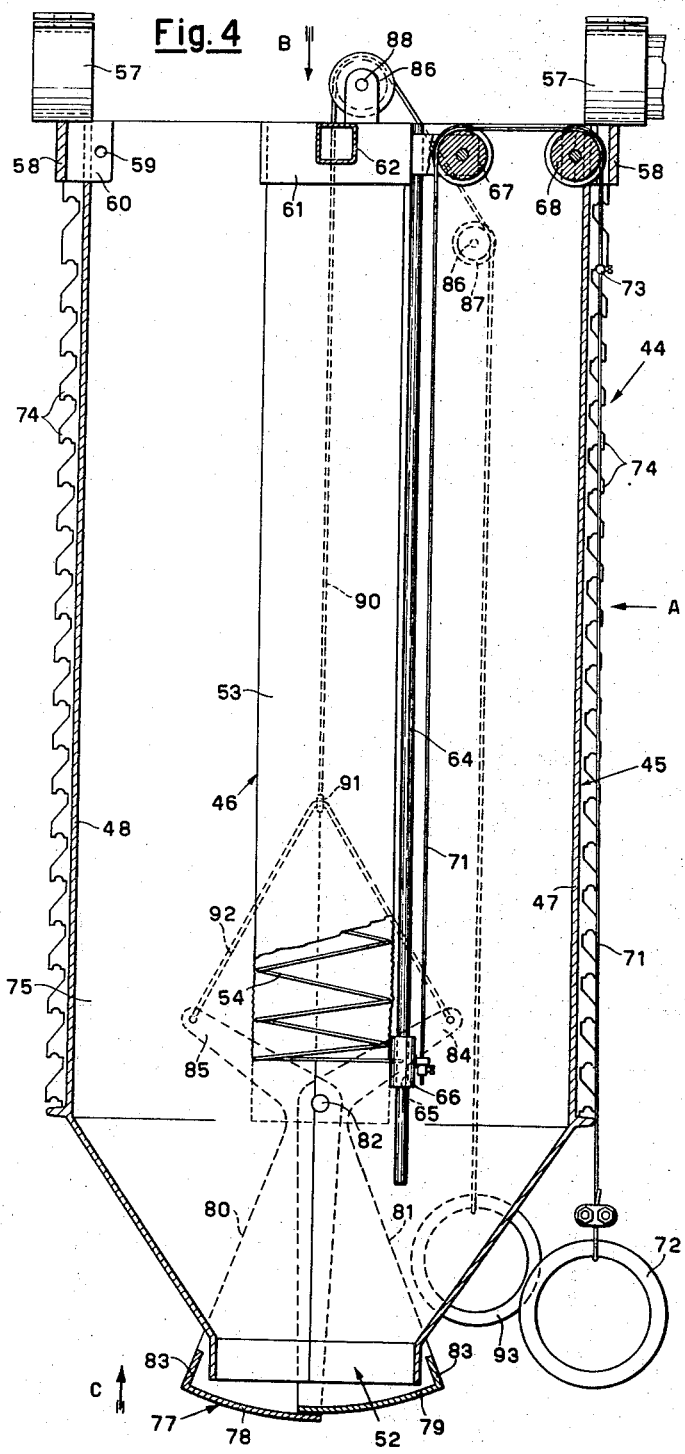
FIG. 4 is a vertical section on the line IV—IV of FIG. 6 illustrating another embodiment of a batch feeder according to the invention.

Said halves 47, 48, are joined together by recessing as shown at 49, and the recessed parts are firmly clamped together by a section 50 in the manner clearly shown (FIG. 8). The lower end of each of said halves 47, 48 is tapered as shown by the reference numeral 51, so that when the halves 47, 48 are joined they define a tapered discharge mouth 52 (FIG. 4). Said discharge mouth 52 is controlled by a valve element indicated overall by the reference numeral 77.

The valve element 77 consists of two equal curved bottom walls 78, 79, (partially superimposed when the valve element is in the closed position as shown) each of which comprises two opposing lateral walls 80, 81, pivoted together in a freely rotable manner on pivots 82 rigid with the external wall of the batch feeder.

Opposing rims 83 extending from the bottom walls join said walls 80, 81, so as to tightly close the mouth 52, as is clearly illustrated.

From one of the two walls 80 and from one of the two walls 81 (FIG. 5) and rigid with them extend two diverging arms 84, 85 respectively.

The valve element 77 so constructed is controlled by a pulley system with two pulleys 86, 87, idly pivoted at 88, 86 respectively, and comprising a cable 90 which at one end is provided with a ring 91 through which a cable 92 passes freely and joins the arms 84 and 85, and at the other end is provided with a grip 93.

It is evident that by pulling the cable 90 downwards in the direction of the arrow, the arms 84, 85 approach each other so causing a mutual withdrawal of the bottom walls 78, 79, and a consequent opening of the aperture 52.

Figure 5:
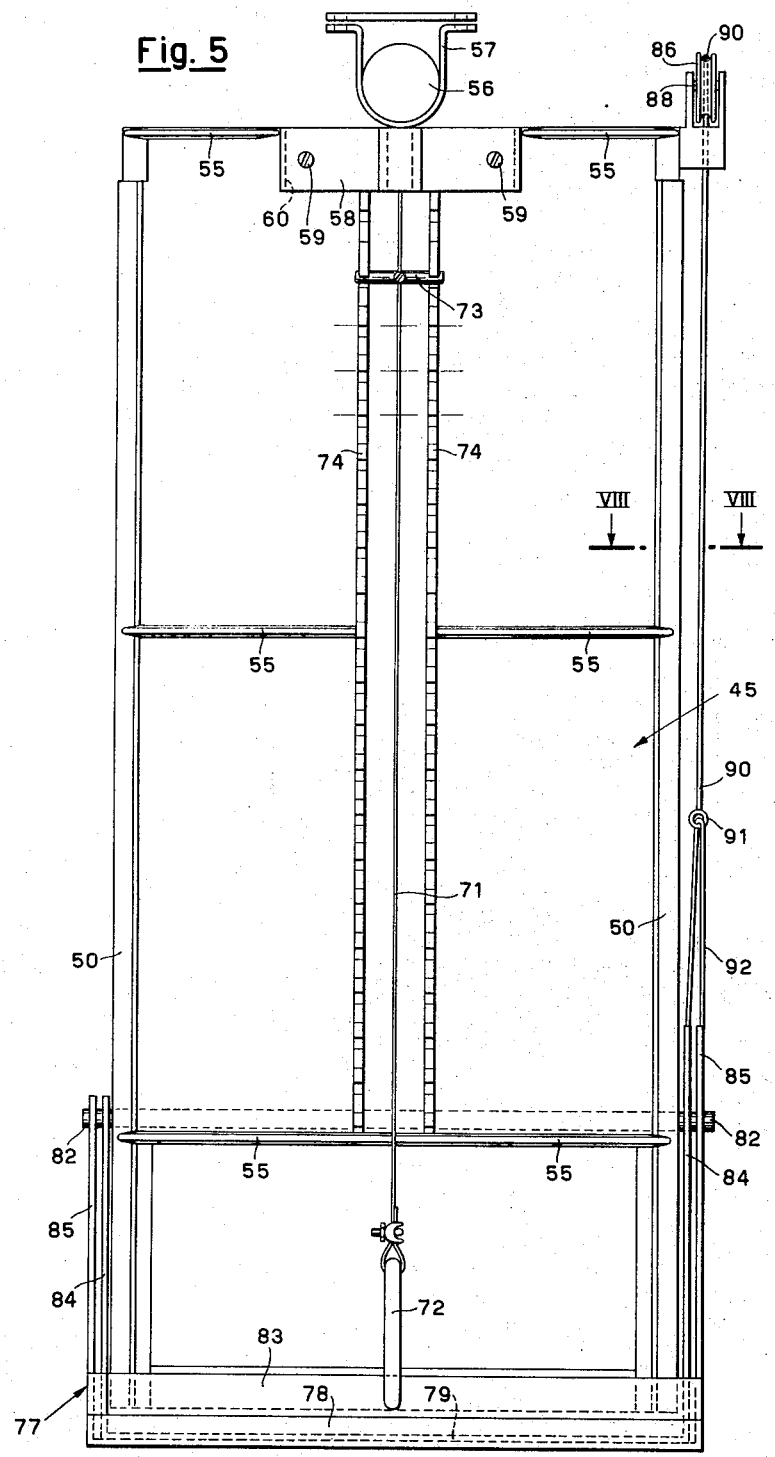
FIG. 5 is an elevational view in the direction of the arrow A of FIG. 4.

The halves 47, 48 are each provided with circumferential strengthening ribs 55 (FIG. 5).

The tubular wall 46 is equal to the body 11 shown in FIGS. 1 – 3, i.e. it consists of a body 53 of flexible material within which is housed a helical spring 54, of which each coil is attached to the body 53. The body 53 is attached to a ring 61 from which two radial arms 62 extend in diammetrically opposing positions, their free ends being housed in notches 63 in the halves 47, 48 of the wall 45 (FIG. 6).

The tubular wall 46 is supported slidably from the bottom upwards and vice versa on a guide rod 64 (FIG. 4) which extends downwards from the ring 61 and passes through a bore 65 in a sleeve 66 rigidly fixed to the lower end of the wall 46.

The sliding of the wall 46 is controlled by a pulley system comprising two pulleys 67, 68 pivoted idly respectively on a bracket 69 welded to the ring and on one of the two brackets 70 suitably formed in one piece with the halves 47, 48 of the wall 45 (FIG. 6). The cable 71 of said pulley system has one end fixed to said sleeve 66 and is provided at its other end with a grip 72.

Said cable 71 is also provided with a retention element 73 (FIG. 4) designed for engagement in the teeth of one of the two rows of teeth 74 formed laterally in one piece in the two halves 47, 48, depending upon whether the pulleys 67, 68 are mounted to the right or to the left of the wall 53.

Different units of measurement, for example kilograms and pounds, are marked on each of said two rows of teeth 74.

Operation of the batch feeder as heretofore described is as follows.

As can be clearly seen from the drawings the two tubular walls 45 and 46 define between them an interspace 75 forming a container of annular cross-section.

The fodder is introduced into said interspace 45 and in order to vary the capacity of the batch feeder and hence the quantity of fodder delivered it is sufficient to simply vary the position of the wall 46 as heretofore explained and as is shown in FIGS. 2 and 3.

Figure 10:
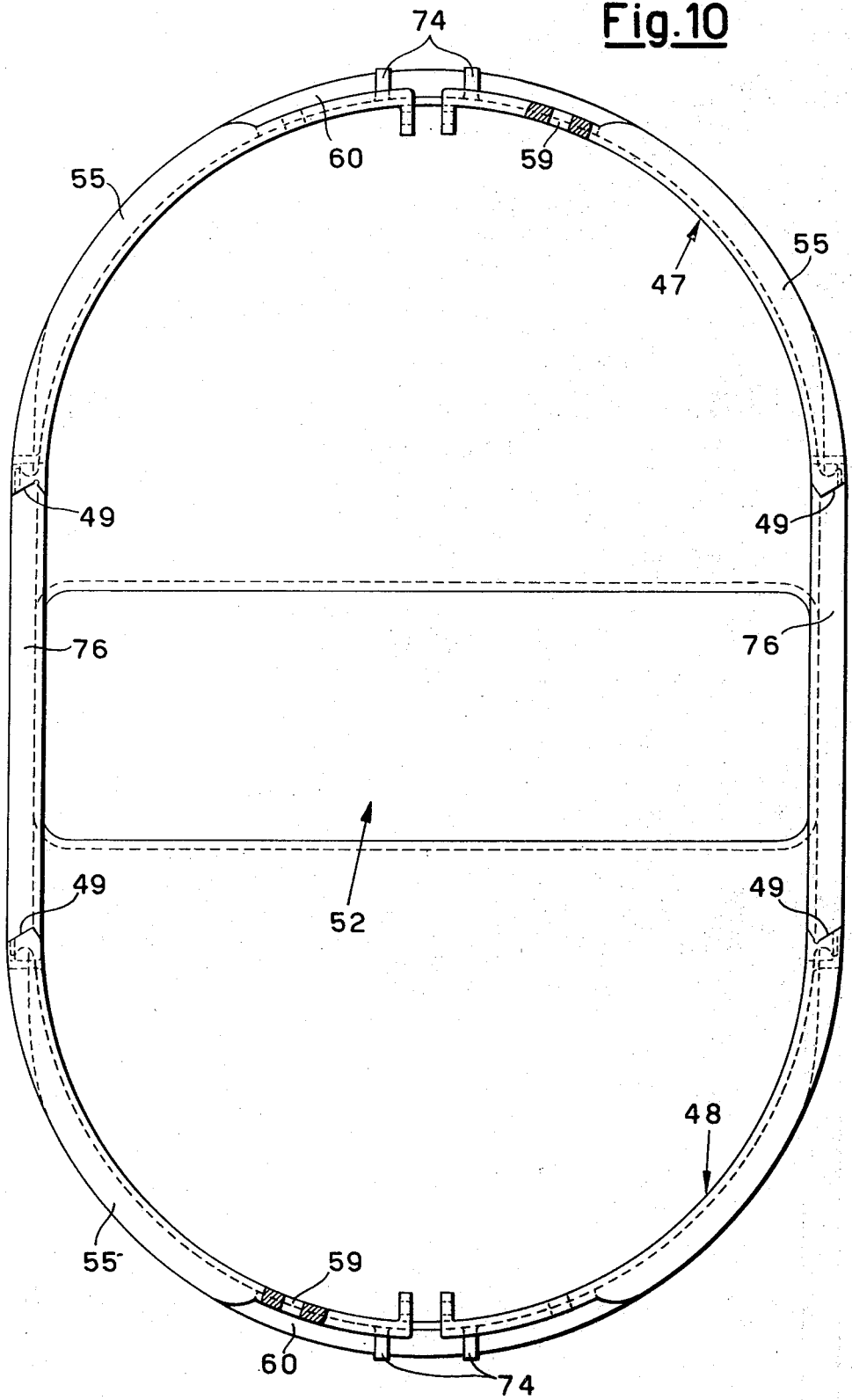
FIG. 10 is a plan view illustrating a possible modification of the batch feeder shown in FIGS. 4 - 9.

The external wall 75 of the batch feeder 44 may also assume the shape of FIG. 10 by connecting the two halves 47, 48 to two straight opposing walls 76, for the purpose of increasing the capacity of the batch feeder.

The batch feeder constructed according to the invention may be employed as a unit by itself (as illustrated) or in combination wuth an automatic system for the distribution of fodder in animal breeding places.

The advantages of such a construction may be summarised in the extreme constructional simplicity and in the elimination of the aforementioned seepage of products which occurs in batch feeders with a bottom consisting of axially mobile valve elements for varying their capacity.

Naturally the batch feeder according to the invention may be used for batching any granular material other than fodder for animals under breeding.

What we claim is:

1. A batch feeder for distributing granular products comprising a support structure, a vertical guide rod attached thereto and extending downwardly therefrom, a discharge hopper slidably mounted on said guide rod and suspended from said support structure by a tubular wall deformable axially and resiliently, said wall having an upper open-end attached to said support structure and a lower end attached to said discharge hopper, means for controlling said axial deformation and simultaneously maintaining a constant volume in the chamber for each dosed amount dispensed and an aperture at the lower end of said hopper provided with a swingable discharge closure which upon being swung from in front of the aperture delivers a measured product.

2. A batch feeder as claimed in claim 1, in which said tubular wall deformable axially and resiliently constitutes the container of the batch feeder.

3. A batch feeder as claimed in claim 1, in which said tubular wall is surrounded by another rigid coaxial tubular wall which forms with it an interspace defining a container of annular cross-section.

4. A batch feeder as claimed in claim 3, in which said rigid tubular wall consists of two equal semicylindrical halves joined together by recessing and formed from a single piece of plastics material.

5. A batch feeder as claimed in claim 1, in which said tubular wall deformable axially and resiliently consists of a helical spring lined with a flexible material attached to the coils of said spring.

* * * * *